US007835026B2

(12) United States Patent
Suzuki

(10) Patent No.: US 7,835,026 B2
(45) Date of Patent: Nov. 16, 2010

(54) APPARATUS, SYSTEM, METHOD, AND PROGRAM FOR ASCERTAINING RECORDING MEDIUM COLLECTION

(75) Inventor: Tatsuya Suzuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 835 days.

(21) Appl. No.: 11/743,213

(22) Filed: May 2, 2007

(65) Prior Publication Data

US 2008/0025736 A1 Jan. 31, 2008

(30) Foreign Application Priority Data

Jul. 28, 2006 (JP) ............................ 2006-205710

(51) Int. Cl.
*G06K 15/00* (2006.01)
*G06F 3/12* (2006.01)

(52) U.S. Cl. ...................................... 358/1.18; 358/1.1

(58) Field of Classification Search .................. 358/1.1, 358/1.8, 1.13, 1.14, 1.15, 1.18; 399/45, 389, 399/396
See application file for complete search history.

(56) References Cited

U.S. PATENT DOCUMENTS 6,345,171 B1 * 2/2002 Suga .......................... 399/396
6,400,912 B1 * 6/2002 Tanaka et al. ................. 399/45

FOREIGN PATENT DOCUMENTS

| | | | |
|---|---|---|---|
| JP | 2002-067457 | A | 3/2002 |
| JP | 2002261992 | A | 9/2002 |
| JP | 2004-223966 | A | 8/2004 |
| JP | 2004-345117 | A | 12/2004 |
| JP | 2005178191 | A | 7/2005 |

* cited by examiner

*Primary Examiner*—Gabriel I Garcia
(74) *Attorney, Agent, or Firm*—Sughrue Mion, PLLC

(57) ABSTRACT

Provided is an image processing device that: adds an identification image forming instruction, to form an identification image for identifying a recording medium on which an image is formed by an image forming device, to a user image forming instruction from a user to the image forming device; holds information for associating information on the identification image with information on the recording medium identified by the identification image; receives information on the identification image in response to an instruction from the user who has recovered a recording medium on which the identification image is formed and updates information held according to the received information; and judges whether information on the identification image has been received with respect to the recording medium on which the image is formed by the image forming device based on the held information to output a judgment result.

7 Claims, 5 Drawing Sheets

FIG.5

| JOB NAME | RELEASE KEY | USER NAME | OUTPUT DATE AND TIME | NUMBER OF RECORDING MEDIA | FLAG INFORMATION |
|---|---|---|---|---|---|
| job×× | ***** | user 1 | yy/mm/dd hh : mm | 10 | FALSE |
| ... | ... | ... | ... | ... | ... |

APPARATUS, SYSTEM, METHOD, AND PROGRAM FOR ASCERTAINING RECORDING MEDIUM COLLECTION

CROSS-REFERENCE TO RELATED APPLICATIONS

This application is based on and claims priority under 35 U.S.C. 119 from Japanese Patent Application No. 2006-205710 filed on Jul. 28, 2006.

BACKGROUND

1. Technical Field

The present invention relates to an image processing device, an image processing and forming system, a computer readable medium, a computer data signal, and an image processing method.

2. Related Art

In a case where an image is formed on a recording medium such as paper using an image forming device such as a printer, it is necessary for a user of the image forming device to recover from a discharge unit the recording medium on which the image is formed. In view of this, various techniques for ascertaining whether the user has collected the recording medium have been proposed.

SUMMARY

According to an aspect of the present invention, there is provided an image processing device including: an adding unit that adds an identification image forming instruction, to form an identification image for identifying a recording medium on which an image is formed by an image forming device, to a user image forming instruction from a user to the image forming device; a holding unit that holds information for associating information on the identification image with information on the recording medium identified by the identification image; an information updating unit that receives information on the identification image in response to an instruction from the user who has recovered a recording medium on which the identification image is formed and updates information held according to the received information; and an outputting unit that judges whether information on the identification image has been received with respect to the recording medium on which the image is formed by the image forming device based on the held information to output a judgment result.

BRIEF DESCRIPTION OF THE DRAWINGS

An exemplary embodiment of the present invention will be described in detail based on the following figures, wherein:

FIG. 5 is an explanatory diagram showing an example of a recording medium management table.

DETAILED DESCRIPTION

Figure 1:
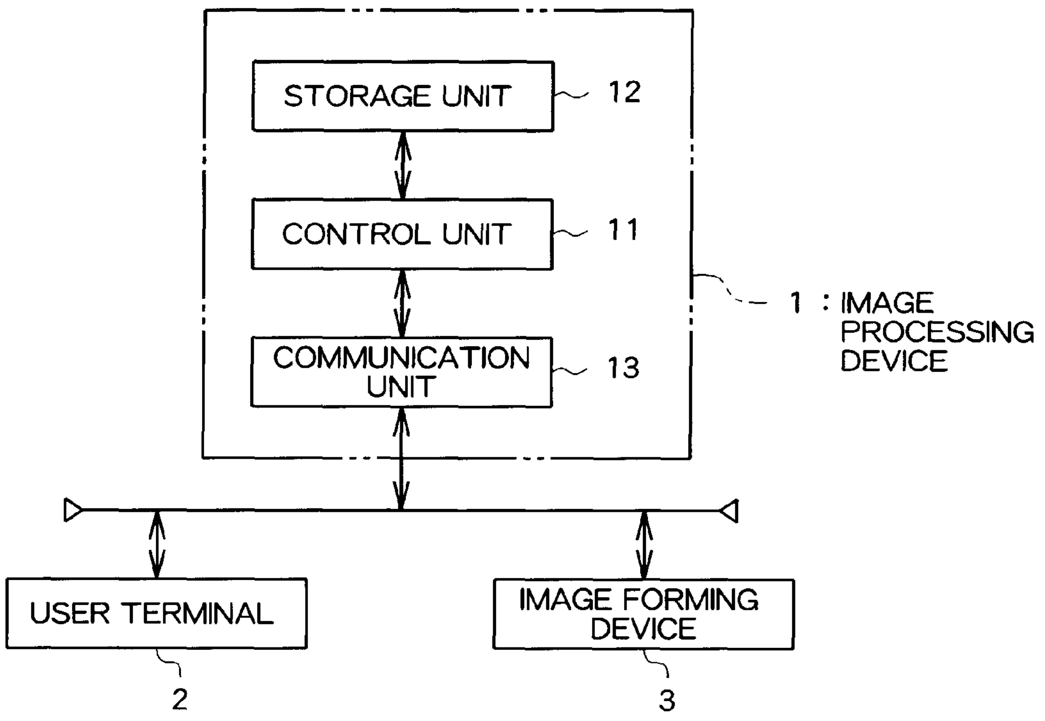
FIG. 1 is a block diagram showing a configuration and connection example of an image processing device according to an exemplary embodiment of the present invention.

Hereinafter, an exemplary embodiment of the present invention will be described with reference to the drawings. As shown in FIG. 1, an image processing and forming system according to an exemplary embodiment of the present invention includes an image processing device 1 and an image forming device 3. It is assumed that the image processing device 1 and the image forming device 3 are connected to each other via an electric communication line.

As shown in FIG. 1, the image processing device 1 is, for example, a print server, and includes a control unit 11, a storage unit 12, and a communication unit 13. It is assumed that the image processing device 1 is connected to a user terminal 2 via an electric communication line.

The control unit 11 is, for example, a CPU, and operates according to a program stored in the storage unit 12. In this exemplary embodiment, the control unit 11 adds an identification image forming instruction to be described later to an image forming instruction sent from the user terminal 2 via the electric communication line, and outputs the image forming instruction to the image forming device 3. Further, the control unit 11 receives information on an identification image sent from the user terminal 2. An example of processing executed by the control unit 11 according to this exemplary embodiment will be described later.

The storage unit 12 is an information storage medium that holds a program executed by the control unit 11, and includes at least one of a memory device such as a RAM and a ROM, and a disk device and the like. The storage unit 12 also operates as a work memory of the control unit 11.

The communication unit 13 is a communication interface such as a modem and a LAN card, and sends information via an electric communication line in response to an instruction sent from the control unit 11. The communication unit 13 also receives information sent via the electric communication line and outputs the received information to the control unit 11.

The user terminal 2 is an information processing device of, for example, a personal computer, which is used by a user who utilizes the image processing and forming system according to this exemplary embodiment. In this exemplary embodiment, the user terminal 2 sends an image forming instruction which is described using, for example, a page description language (PDL) to the image processing device 1 in response to an operation instruction of the user of the user terminal 2. Plural user terminals 2 may be connected to the image processing device 1.

The image forming device 3 is, for example, a printer or a copying machine, and forms an instructed image on a recording medium such as paper, in response to an image forming instruction sent from the image processing device 1. Plural image forming devices 3 may also be connected to the image processing device 1.

Figure 2:
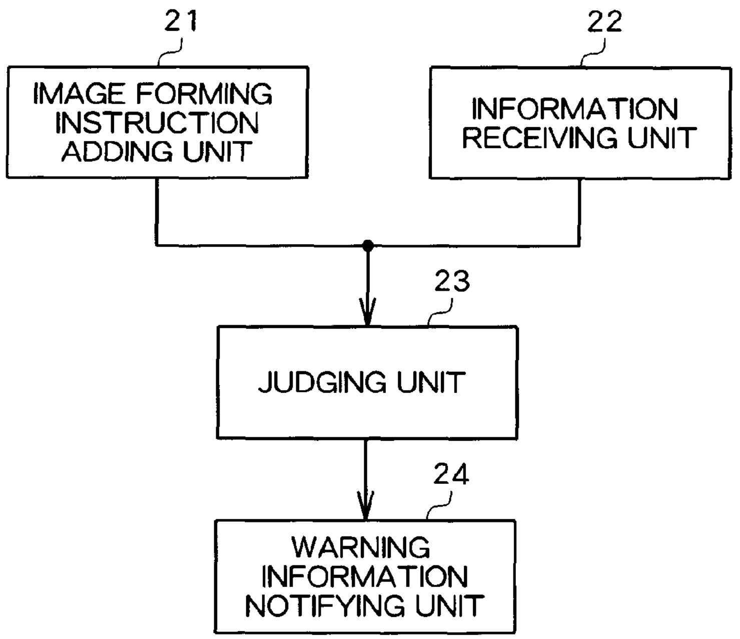
FIG. 2 is a functional block diagram showing functions of the image processing device according to the exemplary embodiment of the present invention.

As shown in FIG. 2, the image processing device 1 includes an image forming instruction adding unit 21, an information receiving unit 22, a judging unit 23, and a warning information notifying unit 24, as functional parts. Their functions can be achieved when, for example, the control unit 11 executes a program stored in the storage unit 12. The program may be provided via an electric communication line such as the Internet, or may be provided while being stored in various computer readable information recording media such as a CD-ROM or a DVD-ROM.

The image forming instruction adding unit 21 acquires an image forming instruction of the user to the image forming device 3. This image forming instruction acquired by the image forming instruction adding unit 21 is called a user image forming instruction. In this exemplary embodiment, the image forming instruction sent from the user terminal 2 corresponds to the user image forming instruction. The user image forming instruction may contain terminal identification information such as an IP address for identifying the user terminal 2 that has sent the user image forming instruction, or user identification information such as a user name for identifying a user who has instructed sending of the image forming instruction. In addition, the user image forming instruction may contain notification destination information such as an e-mail address of the user.

Further, the image forming instruction adding unit 21 adds an identification image forming instruction to the acquired user image forming instruction. In this case, the identification image forming instruction is an image forming instruction to form an identification image for identifying a recording medium on which an image is formed by the image forming device 3 in response to the user image forming instruction. The recording medium is subsequently outputted to a discharge unit of the image forming device 3, and becomes an object to be recovered by the user.

The identification image is an image for identifying a recording medium to be recovered, and is an image which represents, for example, a character string (release key) generated according to a random number by the image processing device 1. Alternatively, the identification image may be an image (code image) which represents a symbol based on data generated according to a random number. The code image is an image which represents a barcode, a QR code, or the like in which data generated according to the random number is embedded. Those various types of identification images may be used as a combination thereof.

Specifically, the image forming instruction adding unit 21 adds the identification image forming instruction using the following illustrated method. In other words, the image forming instruction adding unit 21 may, for example, embed the identification image at a predetermined position of at least some images included in the user image forming instruction, thereby adding the identification image forming instruction. As a specific example, the image forming instruction adding unit 21 embeds an identification image in the image to be formed last among the images included in the user image forming instruction. In this case, on the recording medium on which the image is formed last by the image forming device 3 in response to the user image forming instruction, the identification image is formed together with the image originally included in the user image forming instruction. The identification image may be embedded in an image other than the image to be formed last. Further, the identification image may be embedded in plural images.

Alternatively, the image forming instruction adding unit 21 may add the image forming instruction to form an identification image on a recording medium other than the recording medium on which the image included in the user image forming instruction is formed. Accordingly, the image forming device 3 forms an image on a recording medium according to the user image forming instruction, forms the identification image on another recording medium, and outputs those recording media to the discharge unit. As a specific example, the image forming instruction adding unit 21 adds the identification image forming instruction after the user image forming instruction. Accordingly, the image forming device 3 outputs the recording medium, on which the image according to the user image forming instruction is formed, to the discharge unit, and subsequently outputs to the discharge unit the recording medium on which the identification image is formed.

Further, in this case, the image forming instruction adding unit 21 may add the identification image forming instruction to form an identification image on plural recording media. For example, when the image forming instruction adding unit 21 adds the identification image forming instruction to form the identification image, before and after the user image forming instruction, the image forming device 3 outputs, when outputting a recording medium on which an image is formed according to the user image forming instruction, recording media on each of which the identification image is formed, as the first and the last of the recording media. In this case, the image forming instruction adding unit 21 may add the identification image forming instruction to form different identification images on the media to be outputted first and last.

Figure 3:
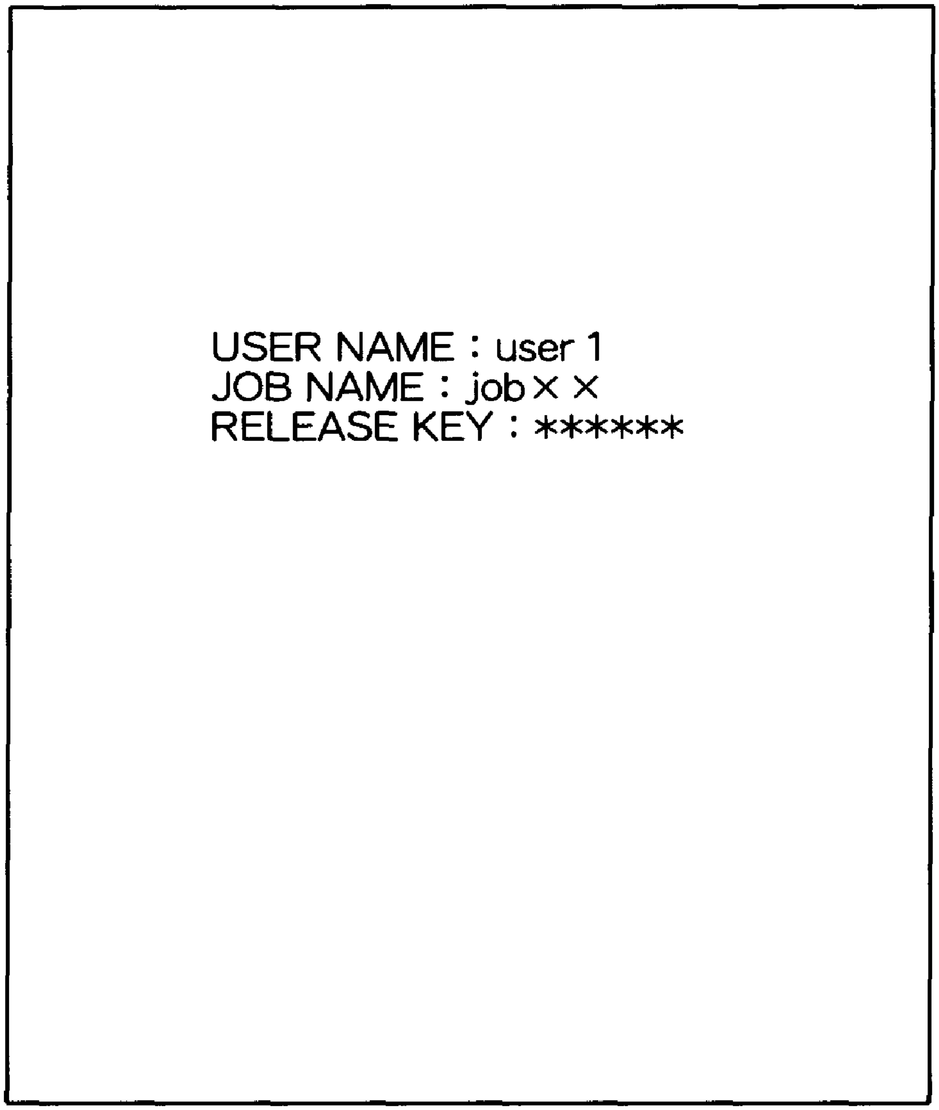
FIG. 3 is an explanatory diagram showing an example of a recording medium on which an identification image is formed.

FIG. 3 is an explanatory diagram showing an example of a recording medium on which an identification image is formed. In the illustrated example, user identification information (user name) for identifying a user who has given a user image forming instruction, instruction identification information (job name) for identifying the user image forming instruction, and an identification image which represents a character string serving as a release key are formed on the recording medium.

In a case where a recording medium (banner sheet or the like) for separating plural documents is outputted by the image forming device 3, the image forming instruction adding unit 21 may add the identification image forming instruction to form the identification image on the recording medium for separating documents.

For example, the identification image identifies one or more recording media on which images are to be formed in response to one user image forming instruction. In this case, the identification image forming instruction to form the identification image for identifying all recording media on which images are formed in response to each corresponding user image forming instruction, is added to each of the user image forming instructions.

Alternatively, the identification image may identify recording media on which images are continuously formed in response to plural user image forming instructions. The image forming instruction adding unit 21 executes, for example, grouping processing for selecting plural user image forming instructions based on the user identification information, and adds the identification image forming instruction to the selected user image forming instructions. In this case, the selected user image forming instructions are continuously outputted to the image forming device 3, and the image forming device 3 continuously forms images in response to the selected user image forming instructions. As a result, image formation is continuously executed in response to the image forming instructions in accordance with an instruction operation by, for example, the same user, and the recording media to be recovered by the user are collectively outputted to the discharge unit. Subsequently, a recording medium on which the identification image for identifying the plural recording media which have been collectively outputted is formed, is outputted to the discharge unit.

Further, the identification image may identify recording media to be continuously outputted to the discharge unit in response to an instruction to start image formation by the user. For example, the image processing device 1 includes an operation unit which accepts an instruction operation by the user. The image processing device 1 may hold an image forming instruction received from the user terminal 2 without outputting the received instruction until the user performs an instruction operation using the operation unit. In this case, the image processing device 1 outputs an image forming instruction to start image formation to the image forming device 3 according to the operation performed using the operation unit by the user to instruct start of image formation. Further, it is assumed that the user can collectively instruct to start image formation relating to plural image forming instructions sent by the user to the image processing device 1. In this case, with respect to the plural image forming instructions to which image formation has been instructed to start, the image forming instruction adding unit 21 adds the identification image forming instruction. As a result, with respect to the recording media to be collectively outputted to the discharge unit in response to the instruction of the user to start image formation, a recording medium on which the identification image for identifying the plural recording media is formed is outputted to the discharge unit.

Figure 4:
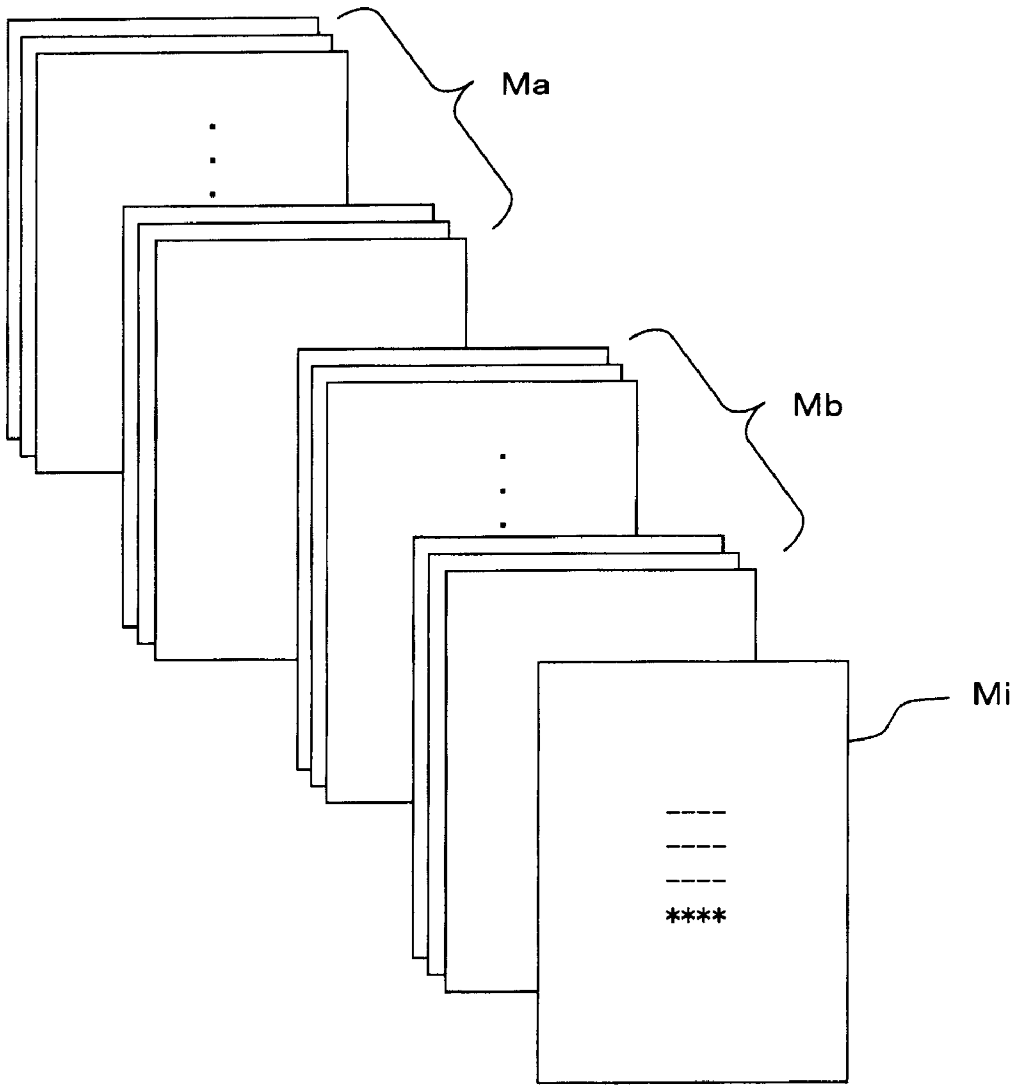
FIG. 4 is an explanatory diagram showing examples of recording media on which images are formed using an image forming device.

FIG. 4 shows an example of recording media to be outputted by the image forming device 3, in a case where an identification image forming instruction is added to plural user image forming instructions by the image forming instruction adding unit 21, in response to the user image forming instructions to which the identification image forming instruction has been added. It is assumed herein that the identification image forming instruction is added to two user image forming instructions Ja and Jb. In this case, as shown in FIG. 4, plural recording media Ma are outputted in response to the image forming instruction Ja, plural recording media Mb are outputted in response to the image forming instruction Jb, and one recording medium Mi on which an identification image is formed in response to the identification image forming instruction are outputted to the discharge unit in a continuous manner. In FIG. 4, a recording medium arranged at the back of the page space represents a recording medium to be outputted earlier, and a recording medium arranged at the front of the page space represents a recording medium to be outputted later.

In this exemplary embodiment, when generating an identification image and adding the identification image forming instruction to the user image forming instruction, the image forming instruction adding unit 21 adds information on the recording medium identified by the generated identification image to a recording medium management table.

In this case, the recording medium management table is data held by the storage unit 12, and associates information on an identification image with information on the recording medium identified by the identification image. Further, the recording medium management table may associate the user identification information for identifying a user who should recover the recording medium, notification destination information, and information on output date and time, the number of recording media, and the like with the information on the recording medium. In addition, the recording medium management table may associate flag information indicating whether the recording medium is recovered with the information on the recording medium. In this case, it is assumed that the flag information is, for example, a value indicating "TRUE" or "FALSE", and "FALSE" is stored as an initial value in the recording medium management table.

FIG. 5 is an explanatory diagram showing an example of a content of the recording medium management table. In the example shown in FIG. 5, the information on the recording medium identified by the identification image is represented by the instruction identification information (job name) for identifying an image forming instruction (job) to form an image on the recording medium. Further, information on the identification image is a character string serving as a release key represented by the identification image.

The information receiving unit 22 receives the information on the identification image in response to an instruction of the user who has recovered the recording medium on which the identification image has been formed. Specifically, for example, the user inputs the information on the identification image to the user terminal 2 using the following illustrated method. In response to this, the information receiving unit 22 receives the information sent from the user terminal 2 to thereby receive the information on the identification image.

A description is given of some examples of a method in which the user inputs the information on the identification image to the user terminal 2. For example, when the identification image is an image representing a character string serving as a release key, the user inputs the character string using the keyboard. In this case, the image processing device 1 may, for example, operate as a web server, generate a web page for the user to input the character string, and output the generated web page. The user terminal 2 executes a program such as a web browser and displays the web page received from the image processing device 1 on a screen. Then, the user terminal 2 sends the character string inputted by the user to the image processing device 1 as the information on the identification image.

Further, when warning information notified by the warning information notifying unit 24 to be described later is displayed on the screen of the user terminal 2, the user may input the information on the identification image on the screen, which displays the warning information.

Further, when the identification image is a code image such as a barcode and a QR code, the user terminal 2 may include an image reading unit, and the code image formed on the recording medium may be read by the image reading unit. In this case, the image reading unit is a device such as a scanner which optically reads an image. The user terminal 2 executes predetermined decode processing with respect to the code image contained in the image read by the image reading unit, and decodes data embedded in the code image. The user terminal 2 sends the decoded data to the image forming device 1 as the information on the identification image.

In this case, the information received by the information receiving unit 22 may contain the user identification information such as a user name for identifying the user who send the information, as well as the information on the identification image. Further, the image processing device 1 may receive the user identification information prior to receiving the information on the identification image, authenticate the user by using password information or the like held in advance, and prompt the authenticated user to input the information on the identification image.

Further, in this exemplary embodiment, the information receiving unit 22 updates the recording medium management table based on the received information. Specifically, based on the received information on the identification image, the information receiving unit 22 updates the flag information associated with the information on the recording medium identified by the identification image, to a value ("TRUE" in this case) indicating that the recording medium has been recovered. Further, in this case, by comparing the user identification information associated with the recording medium with the user identification information contained in the received information, when the two items of information match, the flag information may be updated to the value indicating that the recording medium has been recovered. Alternatively, the information receiving unit 22 may delete the record itself relating to the recording medium from the recording medium management table instead of updating the flag information.

Figure 6:
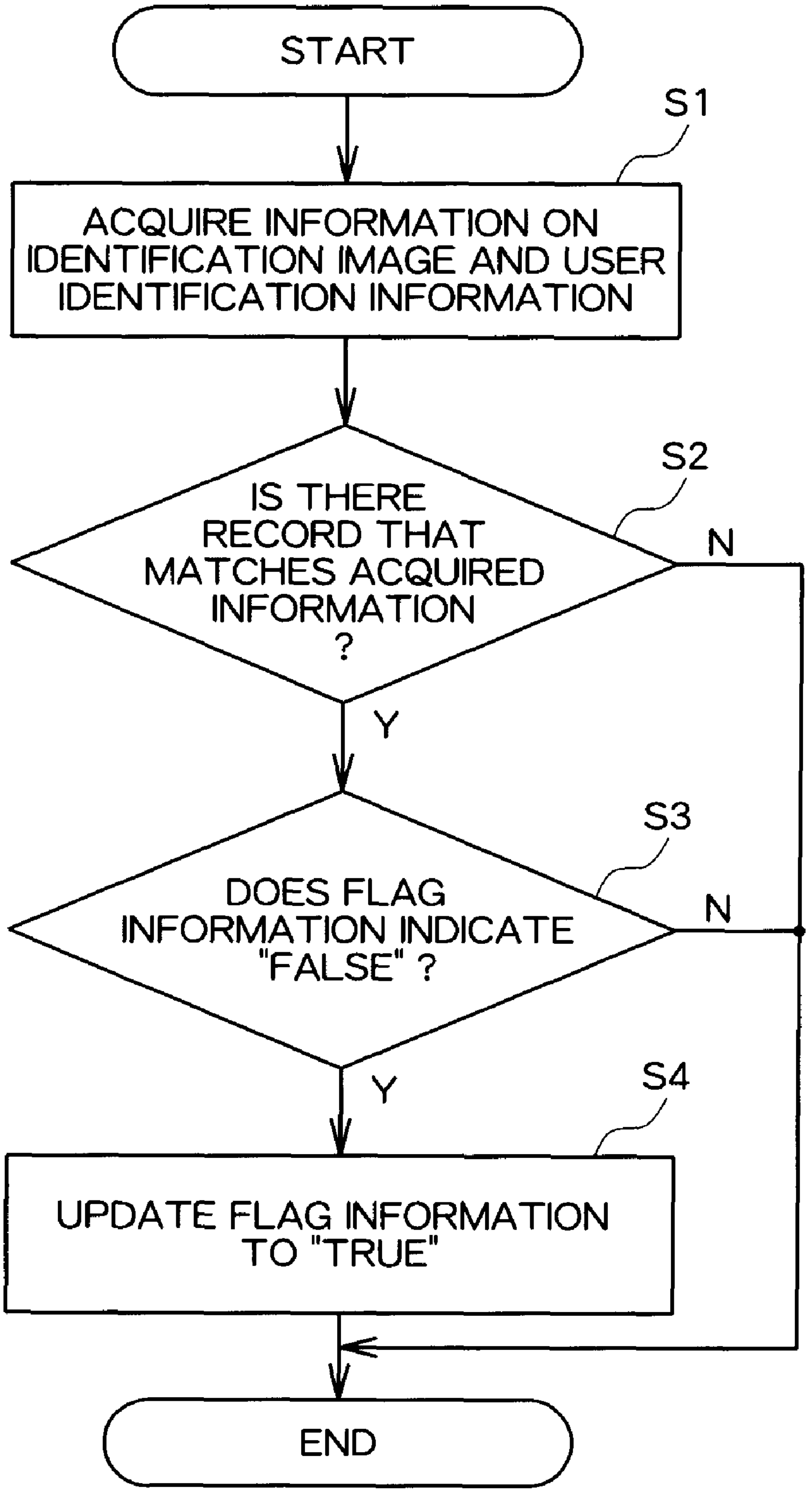
FIG. 6 is a flowchart showing an example of processing executed by the image processing device according to the exemplary embodiment of the present invention.

In this case, an example of the processing executed by the information receiving unit 22 will be described with reference to the flowchart of FIG. 6. First, the information receiving unit 22 receives information sent from the user terminal 2 to thereby acquire information on an identification image and user identification information (S1). Then, the information receiving unit 22 judges whether a record that matches the information on the identification image and the user identification information, which have been acquired in S1, is contained in the recording medium management table (S2). When judging in S2 that a record which satisfies the condition is not contained in the recording medium management table, the information receiving unit 22 ends the processing.

On the other hand, when judging in S2 that a record which satisfies the condition is contained in the recording medium management table, the information receiving unit 22 refers to the flag information contained in the record to judge whether the flag information has a value ("FALSE" in this case) indicating that the recording medium has not been recovered (S3). When judging that the flag information does not indicate "FALSE", the information receiving unit 22 ends the processing. On the other hand, when judging that the flag information indicates "FALSE", the information receiving unit 22 updates the flag information to "TRUE" (S4) and ends the processing. The processing described above is executed every time the information on the identification image is sent from the user terminal 2.

The judging unit 23 judges whether the information on the identification image has been received for the recording medium to be recovered by the user on which the image is formed by the image forming device 3, and outputs the judgment result.

Specifically, for example, the judging unit 23 performs the judgment based on the recording medium management table. In the recording medium management table, the flag information is associated with the information on the respective recording media to be recovered. When the flag information is updated based on the information received by the information receiving unit 22, the judging unit 23 refers to the flag information, and judges whether the information on the identification image has been received for the respective recording media.

Alternatively, when a record is deleted from the recording medium management table based on the information received by the information receiving unit 22, the judging unit 23 judges whether the information on the identification image has been received, based on whether a record relating to the recording media to be judged is contained in the recording medium management table.

The warning information notifying unit 24 outputs predetermined warning information according to the judgment result obtained by the judging unit 23, to thereby notify the user of the warning information. In this case, the warning information notifying unit 24 determines a notification destination of the warning information based on the user identification information or the notification destination information associated with the recording medium to be an object of the warning information notification.

For instance, the warning information notifying unit 24 notifies the warning information to the user who has given the image forming instruction to output a recording medium (hereinafter, referred to as "unrecovered medium") for which the judging unit 23 judges that the information on the identification image has not been received. In addition, by comparing information on a time point when the processing for notifying the warning information is executed with the information on date and time when the image forming instruction to output the recording media is sent to the image forming device 3, when it is judged that a predetermined time period has elapsed since the unrecovered medium is outputted, the warning information notifying unit 24 may notify the warning information. The judging unit 23 and the warning information notifying unit 24 may, for example, execute the processing for judging as to whether there is an unrecovered medium and notifying the warning information every predetermined time period.

The warning information is sent to the user terminal 2 by, for example, e-mail. Alternatively, the warning information may be sent to a program for displaying the warning information which is executed at the user terminal 2. In both cases, the warning information to be notified may be varied for each user, or may be common among users. The warning information may contain, for example, information on the unrecovered medium, information on the user who has given the image forming instruction to output the unrecovered media, and information on the elapsed time since the unrecovered media is outputted.

Further, the image processing device 1 may execute the following processing according to the judgment result obtained by the judging unit 23.

For example, the image processing device 1 may cause the display unit to display the information on the unrecovered media according to an instruction operation of an administrator. Alternatively, when discarding the recording medium which has not been recovered and left on the discharge unit of the image forming device 3, the administrator may notify information indicating that the recording medium is to be discarded, to the user who has given the image forming instruction to output the unrecovered medium, according to the judgment result obtained by the judging unit 23.

Further, upon receipt of a new image forming instruction, the image processing device 1 may execute the following processing. Specifically, the image processing device 1 refers to the recording medium management table to acquire the information on the unrecovered media which is associated with the user who has given the image forming instruction. When the acquired information satisfies a predetermined condition, the image processing device 1 stops the processing for the image forming instruction which is newly received, and notifies the user of the processing which has been stopped.

For instance, when there are more than a predetermined number of unrecovered media to which the user has given the image forming instruction, the image processing device 1 stops the processing for the image forming instruction which has been newly received. Alternatively, when the elapsed time since an unrecovered medium is outputted becomes more than a predetermined value, the image processing device 1 may stop the processing for the image forming instruction which has been newly received.

The exemplary embodiment of the present invention is not limited to the cases described above. For example, the image forming device 3 may be various types of devices for forming an image on a recording medium. As an example, the image forming device 3 may be a facsimile receiving apparatus. Further, the image processing device 1 may be integrated with the image forming device 3.

In addition, the functions realized by the image processing device 1 in the above description may be realized by an image processing system including plural devices.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device, comprising:

an acquiring unit that acquires a user image forming instruction from a user;

an identification image forming instruction unit that generates, in response to the acquiring unit acquiring the user image forming instruction, an identification image forming instruction to instruct the image forming device to form an identification image that identifies a recording medium on which the image is formed;

a holding unit that holds information for associating information on the identification image with information on the recording medium identified by the identification image;

an information receiving unit that updates, in response to receiving the information on the identification image from the user who has recovered the recording medium on which the identification image is formed, the information held by the holding unit associated with the information on the identification image; and an outputting unit that judges whether the information on the identification image has been received with respect to the recording medium on which the image is formed by the image forming device, based on whether the information held by the holding unit has been updated, to output a judgment result.

2. The image processing device according to claim 1, wherein:

the acquiring unit acquires a plurality of the user image forming instructions;

the identification image forming instruction unit generates, in response to the acquiring unit acquiring the plurality of the user image forming instructions, an identification image forming instruction to instruct the image forming device to form an identification image that identifies recording media on which images are continuously formed; and the outputting unit judges whether information on the identification image has been received with respect to the recording media on which the images are continuously formed in response to the plurality of user image forming instructions.

3. The image processing device according to claim 1, further comprising a warning information notifying unit that notifies, when the judgment result shows that the information on the identification image has not been received, the user of information according to the judgment result.

4. The image processing device according to claim 2, further comprising a warning information notifying unit that notifies, when the judgment result shows that the information on the identification image has not been received, the user of information according to the judgment result.

5. An image processing and forming system, comprising:

an image processing device; and an image forming device, wherein:

the image processing device comprises:

an acquiring unit that acquires a user image forming instruction from a user;

an identification image forming instruction unit that generates, in response to the acquiring unit acquiring the user image forming instruction, an identification image forming instruction to instruct the image forming device to form an identification image that identifies a recording medium on which the image is formed;

a holding unit that holds information for associating information on the identification image with information on the recording medium identified by the identification image;

an information receiving unit that updates, in response to receiving the information on the identification image from the user who has recovered the recording medium on which the identification image is formed, the information held by the holding unit associated with the information on the identification image; and an outputting unit that judges whether the information on the identification image has been received with respect to the recording medium on which the image is formed by the image forming device, based on whether the information held by the holding unit has been updated, to output a judgment result; and the image forming device comprises an image forming unit that forms an image including the identification image on the recording medium in response to the identification image forming instruction and the user image forming instruction.

6. A tangible computer readable medium storing a program causing a computer to execute a process, the process comprising:

acquiring a user image forming instruction from a user;

generating, in response to the acquiring the user image forming instruction, an identification image forming instruction to instruct the image forming device to form an identification image that identifies a recording medium on which an image is formed;

storing information for associating information on the identification image with information on the recording medium identified by the identification image;

updating, in response to receiving the information on the identification image from the user who has recovered the recording medium on which the identification image is formed, the stored information associated with the information on the identification image; and judging whether information on the identification image has been received with respect to the recording medium on which the image is formed by the image forming device, based on whether the stored information has been updated, to output a judgment result.

7. An image processing method, comprising:

acquiring a user image forming instruction from a user;

generating, in response to the acquiring the user image forming instruction, an identification image forming instruction to instruct the image forming device to form an identification image that identifies a recording medium on which an image is formed;

storing information for associating information on the identification image with information on the recording medium identified by the identification image;

updating, in response to receiving the information on the identification image from the user who has recovered the recording medium on which the identification image is formed, the stored information associated with the information on the identification image; and judging whether information on the identification image has been received with respect to the recording medium on which the image is formed by the image forming device, based on whether the stored information for associating information on the identification image with information on the recording medium identified by the identification image has been updated, to output a judgment result.

* * * * *